United States Patent
Lappan et al.

(10) Patent No.: US 10,094,253 B2
(45) Date of Patent: Oct. 9, 2018

(54) VALVE DEVICE FOR A HYDRAULIC CIRCUIT AND OIL PUMP REGULATING ARRANGEMENT

(71) Applicant: PIERBURG GMBH, Neuss (DE)

(72) Inventors: Rolf Lappan, Cologne (DE); Christoph Sadowski, Sprockhoevel (DE); Lukas Romanowski, Osnabrueck (DE); Turgut Yilmaz, Cologne (DE)

(73) Assignee: PIERBURG GMBH, Neuss (DE)

( * ) Notice: Subject to any disclaimer, the term of this patent is extended or adjusted under 35 U.S.C. 154(b) by 582 days.

(21) Appl. No.: 14/653,855

(22) PCT Filed: Nov. 19, 2013

(86) PCT No.: PCT/EP2013/074176
§ 371 (c)(1),
(2) Date: Jun. 19, 2015

(87) PCT Pub. No.: WO2014/095207
PCT Pub. Date: Jun. 26, 2014

(65) Prior Publication Data
US 2015/0330271 A1    Nov. 19, 2015

(30) Foreign Application Priority Data

Dec. 21, 2012    (DE) .................. 10 2012 112 879

(51) Int. Cl.
*F01M 1/02*    (2006.01)
*F01M 1/16*    (2006.01)
(Continued)

(52) U.S. Cl.
CPC ............. *F01M 1/16* (2013.01); *F04B 49/002* (2013.01); *F04B 53/1082* (2013.01);
(Continued)

(58) Field of Classification Search
CPC .............................................. F01M 2001/0246
See application file for complete search history.

(56) References Cited

U.S. PATENT DOCUMENTS 4,838,313 A    6/1989    Kobayashi et al.
5,513,673 A  *  5/1996    Slavin ................. F16K 31/0613
                                                        137/625.65
(Continued)

FOREIGN PATENT DOCUMENTS

DE    35 22 450 A1    1/1987
DE    44 47 154 A1    7/1996
(Continued)

*Primary Examiner* — F. Daniel Lopez
(74) *Attorney, Agent, or Firm* — Norman B. Thot (57) ABSTRACT

A valve device for a hydraulic circuit includes an actuator unit and a valve unit. The actuator unit comprises an electromagnetic circuit comprising an armature which moves in a translational manner, a core, a coil carrier, a coil configured to be energized, and a flux guiding device. The coil is arranged on the coil carrier. The valve unit comprises a valve housing comprising a transverse bore which serves as a first control chamber pressure port, a regulating slide mounted in the valve housing, the regulating slide being configured to move axially, a first outlet port, an inlet port, and a second control chamber pressure port arranged between the inlet port and the first outlet port.

13 Claims, 3 Drawing Sheets

(51) Int. Cl.
  *F16K 11/06*  (2006.01)
  *F04B 49/00*  (2006.01)
  *F16K 31/06*  (2006.01)
  *G05D 16/20*  (2006.01)
  *F04B 53/10*  (2006.01)
  *F16K 27/02*  (2006.01)
  *F16K 27/04*  (2006.01)
  *F15B 13/044* (2006.01)

(52) U.S. Cl.
  CPC ............ *F16K 11/06* (2013.01); *F16K 27/029* (2013.01); *F16K 27/041* (2013.01); *F16K 31/0613* (2013.01); *G05D 16/2013* (2013.01); *F01M 2001/0246* (2013.01); *F15B 13/0442* (2013.01); *F15B 2211/20553* (2013.01); *Y10T 137/85978* (2015.04); *Y10T 137/86879* (2015.04)

(56) References Cited

U.S. PATENT DOCUMENTS

| | | | |
|---|---|---|---|
| 5,848,613 A * | 12/1998 | Sakaguchi | F15B 13/0402 137/625.65 |
| 2004/0035476 A1 | 2/2004 | Holmes et al. | |
| 2010/0139611 A1 | 6/2010 | Hunter | |
| 2010/0221126 A1* | 9/2010 | Tanasuca | F01M 1/02 417/218 |
| 2013/0099144 A1 | 4/2013 | Buse et al. | |

FOREIGN PATENT DOCUMENTS

| | | |
|---|---|---|
| DE | 11 2008 000 978 T5 | 6/2010 |
| EP | 0 443 561 A1 | 8/1991 |
| EP | 1 233 220 A2 | 8/2002 |
| EP | 2 031 475 A2 | 3/2009 |

* cited by examiner

VALVE DEVICE FOR A HYDRAULIC CIRCUIT AND OIL PUMP REGULATING ARRANGEMENT

CROSS REFERENCE TO PRIOR APPLICATIONS

This application is a U.S. National Phase application under 35 U.S.C. § 371 of International Application No. PCT/EP2013/074176, filed on Nov. 19, 2013 and which claims benefit to German Patent Application No. 10 2012 112 879.0, filed on Dec. 21, 2012. The International Application was published in German on Jun. 26, 2014 as WO 2014/095207 A1 under PCT Article 21(2).

FIELD

The present invention relates to a valve device for a hydraulic circuit having an actuator unit with an electromagnetic circuit comprising an armature movable in a translational manner, a core, an energizable coil arranged on a coil carrier and flux-guiding devices, a valve unit having a valve housing in which a regulating slide is mounted in an axially movable manner, and an outlet port, an inlet port, and a control chamber pressure port arranged between the inlet port and the outlet port, as well as an oil pump regulating arrangement having such a valve device, a variable oil pump having a control chamber and an oil sump, wherein the control chamber pressure port is in fluid connection with the control chamber of the oil pump, the outlet port is in fluid connection with oil sump, and the discharge pressure of the oil pump is applied to the inlet port.

BACKGROUND

Such valve devices serve to provide pressure control for hydraulic actuators, for example, in control systems for automatic gearboxes, or for regulating the pressure in a control chamber of a variable oil pump of an oil circuit for lubricating units and an internal combustion engine of a motor vehicle. A ring of a discharge chamber upon which a rotor of a vane pump or a gear pump rolls off is displaced or turned via the pressure in the control chamber, thereby regulating the volume flow.

The pressure control valves used for this purpose are configured as multi-way solenoid valves by means of which the pump control chamber can either be relieved via the oil sump or loaded by means of an additional pressure from the discharge pressure of the oil pump. Pressure relief valves are also frequently installed in the control loop which delimit the maximum discharge pressure.

Such a system for controlling the pressure in two control chambers of an oil pump having a solenoid valve is described, for example, in DE 11 2008 000 978 T5. The differential pressure between the two control chambers is changed depending on the discharge pressure and the position of the regulating slide of the solenoid valve. This system also comprises a pressure relief valve via which the oil from the discharge side of the pump can be returned to the suction side if an excessive discharge pressure prevails. The use of an additional pressure relief valve is a drawback.

A solenoid valve integrating the function of the pressure relief valve for an oil pump adapted to be regulated via a control chamber is described in DE 10 2010 025 171 A1. This solenoid valve comprises an electromagnetically operable valve member connected with the armature, which valve member either blocks a passage from the inlet port to the control chamber pressure port connected with the control chamber of the oil pump, or a passage from the control chamber port to the outlet port, depending on the energization of the solenoid valve. The pressure at the control chamber pressure port and thus in the control chamber of the pump is thereby either increased or decreased depending on the required volume flow of the oil pump. The discharge pressure also acts upon the valve member so that a force is produced which moves the valve member into the position in which the connection of the control chamber pressure port to the outlet port is established when the force exceeds a maximum allowable value.

EP 2 031 475 A2 describes a pressure control valve where a regulating slide is mounted in an axially movable manner in the valve housing, the regulating slide being spring-loaded from both axial ends. The ports are defined by transverse bores in the housing, wherein the control chamber pressure port is arranged between the discharge pressure port and the outlet port which is defined at the side of the valve housing remote from the actuator unit.

These valves either have no pressure relief functions, or the pressure relief function is directly dependent on the outlet pressure of the pump. This may lead to a poor oil supply of the internal combustion engine at high flow resistances in the circuit. There is also no regulating pressure feedback via the pressure applied to the internal combustion engine.

SUMMARY

An aspect of the present invention is to provide a valve device and an oil pump regulating arrangement having such a valve device which combines the functions of opening for pressure relief purposes and pressure regulation via the pressure to be actually regulated in a valve device. A sufficient pressure for increasing the discharge pressure is thus to be provided, an opening of the valve depending on the pressure to be regulated is to be allowed, and a sufficient lubrication in each state of the internal combustion engine is to be provided. An additional aspect of the present invention is that the valve device be adapted to be actuated largely independently of the required discharge pressure using small actuating forces, and thus be operated by solenoid valves. A matching of actuating forces is thereby to be possible. Another aspect of the present invention is that the valve device be adapted to have a long service life and be easy to install.

In an embodiment, the present invention provides a valve device for a hydraulic circuit which includes an actuator unit and a valve unit. The actuator unit comprises an electromagnetic circuit comprising an armature configured to move in a translational manner, a core, a coil carrier, a coil configured to be energized, and a flux guiding device. The coil is arranged on the coil carrier. The valve unit comprises a valve housing comprising a transverse bore configured to serve as a first control chamber pressure port, a regulating slide mounted in the valve housing, the regulating slide being configured to move axially, a first outlet port, an inlet port, and a second control chamber pressure port arranged between the inlet port and the first outlet port.

BRIEF DESCRIPTION OF THE DRAWINGS

The present invention is described in greater detail below on the basis of embodiments and of the drawings in which.

DETAILED DESCRIPTION

Since the valve housing comprises an additional transverse bore which serves as a control pressure port, both opening for performing the pressure limiting function independent of the outlet pressure of the oil pump, and opening or closing depending on the pressure to be actually regulated can be carried out. The present invention provides an oil pump regulating arrangement in which the control pressure port is connected with an oil line branching off at the internal combustion engine after oil has flown through other units. The valve is thus opened, and the discharge pressure of the oil pump is reduced due to an exceeding of the proper maximum allowable pressure at the internal combustion engine. The opening force acting upon the armature is also changed depending on the pressure to be regulated, that is, the pressure at the inlet of the internal combustion engine. A sufficient maximum pressure can also be provided by the connection of the regulating port to the inlet port where the pump outlet pressure prevails.

In an embodiment of the valve device of the present invention, the outlet port can, for example, be arranged at the end of the valve unit opposite to the actuator unit, and the control pressure port can, for example, be arranged between the actuator unit and the inlet port, wherein the pressure applied to the control pressure port acts towards the actuator unit upon the armature. This arrangement allows a pressure balance at the armature to be realized even during installation of a valve in the oil sump when the chamber between the armature and the core is connected with the surroundings.

In an embodiment of the present invention, the pressure applied to the control pressure port acts upon an application surface which is defined by a shoulder at the armature or at the regulating slide or by a different cross-sectional area of the armature and the regulating slide. A surface is thus made available in a simple manner upon which the regulating pressure may act for feeding back the controlled variable.

In an embodiment of the present invention, this application surface can, for example, be defined at the axial end of the armature whose cross-sectional area radially projects beyond the cross-sectional area of the regulating slide. This facilitates manufacture since the shoulder need not be produced by additional mechanical treatment.

In an embodiment of the present invention, the armature can, for example, be loaded by a spring element in the opening direction of the inlet port towards the armature seat and be adapted to be loaded by the actuator unit and by the pressure at the control pressure port via the regulating slide in the opening direction of the outlet port and the opening direction of the armature seat. The selection of the spring element and the size of the effective armature surface therefore allows a desired pressure level to be adjusted at which the valve is switched. In the non-energized state, the pressure is increased so that even in the case of failure of the solenoid valve, a sufficient oil supply to the internal combustion engine is provided without an overpressure building up.

In an embodiment of the present invention, the regulating slide can, for example, comprise a first control surface via which, optionally, the free flow cross-section between the inlet port and the control chamber pressure port or the free flow cross-section between the control chamber pressure port and the outlet port is adapted to be regulated, or the control chamber pressure port is adapted to be closed. Due to the hydraulic pressure, a state of equilibrium between the electromagnetic force, the spring force, and the force acting upon the armature surface can accordingly be achieved where the two fluid connections are closed so that the loss during oil feed is considerably reduced since a permanent opening and closing, which is performed in other valves and the resultant oil flow to the tank, is prevented.

In an embodiment of the present invention, the regulating slide can, for example, comprise a second control surface which separates the inlet port from the control pressure port. The control pressure port is accordingly permanently separated from the other ports independently of the position of the regulating slide. Only the feedback pressure to be regulated thus acts upon the armature surface.

In an embodiment of the present invention, the end of the spring element opposite to the armature rests against a shoulder of an adjusting screw which is fastened to a threaded bore in the core. This adjusting screw can adjust the spring force which allows for adjusting different pressure ranges even when the same individual parts are used in the actuator unit without influencing any oil throughput. Manufacturing dispersions of the spring forces can be compensated for by the adjusting screw.

In an embodiment of the present invention, a projection can, for example, extend from the shoulder of the adjusting screw towards the armature, which projection is surrounded by the spring element. Guiding the spring element is thereby provided in a simple manner, whereby buckling of the spring element is prevented, and functional safety is thus increased.

In an embodiment of the present invention, a non-magnetizable stop sleeve is fastened in a bore of the core, against which the armature rests in its fully attracted position. This prevents the magnetized armature from sticking to the core or to the stop if this is made of a magnetizable material. The spring forces can thus be reduced. This simplifies a fixed mounting of the stop to the core by force-fitting, for example, so that no further components need be used.

When the valve device is arranged in the oil sump, it can be advantageous when the adjusting screw and a core screw comprise a bore in the core via which an actuator room between the armature and the core is connected with a second outlet port which is arranged at the end of the valve device opposite to the first outlet port. A pressure-balanced valve is thereby provided which does not require a bore in the armature and in the regulating slide. The manufacture is thus considerably simplified. Such a valve device is accordingly advantageously arranged in the oil sump.

In an embodiment of the present invention, the regulating slide and the armature can, for example, comprise a longitudinal through-going bore via which the actuator room between the armature and the core is in fluid connection with the outlet port. The same pressure thus always prevails at both axial ends of the unit made up of the armature and the regulating slide even when the valve device is arranged in the engine room according to an embodiment of the oil pump regulating arrangement. When identical effective force application surfaces are defined, an equilibrium of forces can be produced, whereby a rapid operation of the valve at smaller effective forces is provided for.

A clamping bush with axially extending openings is additionally fastened in the first outlet port upon which a readjusting spring is supported via which the regulating slide is loaded towards the armature. This allows the armature and the regulating slide to be manufactured as two separate parts, wherein, due to the spring force of the readjusting spring, the regulating slide follows the movement of the armature.

In an embodiment of the present invention, the regulating slide can, for example, be force-fitted into an opening of the armature. This allows the readjusting spring to be omitted without the need to form the armature and the regulating slide integrally with each other since detachment of the regulating slide would otherwise result in an abrupt increase in the application surface of the oil regulating pressure.

A valve device is thus provided which combines the functions of a pressure relief valve and a pressure regulating valve, wherein the pressure to be regulated is fed back to the regulating system via a separate port. This allows for a particularly exact regulation of the oil pressure at the inlet of the internal combustion engine. Via this valve device and the corresponding oil pump regulating arrangement, an optimum pressure is thus always supplied to the internal combustion engine, wherein both a supply shortfall and an overpressure are reliably prevented. The regulation is carried out very rapidly, wherein low actuating forces are required at the solenoid valves.

Several exemplary embodiments of valve devices according to the present invention and the associated oil pump regulating arrangement are shown in the drawings and will be described hereunder.

In the following, the same components and thus the same reference numerals are used in the description of the drawings of the embodiments.

The valve devices according to the present invention shown in the drawings are composed of an actuator unit 10 to which a valve device 12 is fastened. The actuator unit 10 comprises an electromagnetic circuit 14 which is composed of a coil 18 wound on a coil carrier 16, a core 20 inside the coil carrier 16, an armature 22 movable in a translational manner and the flux guiding means completing the electromagnetic circuit 14. The flux guiding means are two flux return metal sheets 24, 26 arranged at the axial ends of the coil 18 and being in conducting connection with a yoke 28 externally surrounding the coil 18 as well as a flux return bush 30 connected with the inside of the coil 18 and the lower flux return metal sheet 26 and whose first axial portion 32 is fastened in the radial inside of the coil carrier 16 with a sealing ring 34 being interposed and whose axially adjacent second portion 36 extends towards the valve device 12 and radially surrounds a portion of a valve housing 38 of the valve device 12 for fastening the valve housing 38 to the actuator unit 10. The coil 18 is surrounded by a plastic jacket 40 which comprises a plug portion (not shown in the drawings) for electrical supply of the coil 18.

The core 20 comprises an axially extending and centrally stepped longitudinal bore 42 whose portion remote from the valve device 12 is configured as a threaded bore 44 and is fastened in the coil carrier 16. At its end facing away from the valve device 12, the core 20 comprises a circumferential recess 46 at the outer circumference into which the upper flux return metal sheet 24 circumferentially extends for fastening purposes.

A core screw 48 is screwed into the threaded bore 44 of the core 20 via which the magnetic force of the electromagnetic circuit 14 can be adjusted. In the portion of the threaded bore 44 located closer to the valve device 12, another adjusting screw 50 is arranged whose screw stem 52 does not comprise a thread and extends through a constricted area 54 of the longitudinal bore 42 towards the valve device 12. The screw stem 52 comprises a circumferential groove 56 in which a sealing ring 58 is arranged whose radially outer area rests against the inner wall of the core 20. The screw stem 52 comprises a shoulder 60 behind the constricted area 54 of the longitudinal bore 42 of the core 20, from which shoulder 60 a projection 62 with a smaller circumference extends in the axial direction towards the valve device 12. A spring element 64 rests against this shoulder 60, whose opposite axial end rests in a biased manner against the armature 22. By screwing in or screwing out the adjusting screw 50, the spring force acting upon the armature 22 can be adjusted and thus matched to the respective requirements.

The spring element 64 radially surrounds the projection 62 and is radially surrounded by a non-magnetizable stop sleeve 66 acting as a stop which is configured as a hollow cylinder and is fastened via a crimp connection in the longitudinal bore 42 at the side of the constricted area 54 axially opposite to the threaded bore 44 in the shown embodiment. The stop sleeve 66 is arranged in the longitudinal bore 42 so that it restricts the translational movement of the armature 22 towards the core 20. A striking of the armature 22 against the core 20 is thereby avoided and a gap 68 remains even in the attracted state of the armature 22.

When the coil 18 is energized, a magnetic attraction force between the armature 22 and the core 20 is produced, the core 20 comprising an annular tapering projection 70 for concentrating the axially extending magnetic field lines, an axial end of the armature 22 being inserted into the inside of the projection 70 when the coil 18 is energized. The core 20 comprises a circumferential recess 72 at a location axially at the level of the core screw 48, the recess 78 preventing a scattering of the magnetic field lines in the core 20 and thus improving the fine adjustment via the core screw 48. Another sealing ring 74 configured as an O-ring is also arranged between the core 20 and the coil carrier 16 in the area between recess 72 and recess 46, via which sealing ring 74 along with the sealing rings 34, 58 an actuator room 76 inside the actuator unit 10 between the coil carrier 16, the core 20 and the armature 22 is sealed towards the outside.

The armature 22 is guided in a slide bush 78 which is arranged in the radial inside of the first axial portion 32 of the flux return bush 30. The armature 22 comprises an annular enlarged portion 80 which is directed towards the core 20 and against which the spring element 64 rests. The diameter of this annular enlarged portion 80 is slightly smaller than the inner diameter of the projection 70 of the core 20 so that the annular enlarged portion 80 of the armature 22 is inserted into the core 20 when the solenoid valve is operated. The movement of the armature 22 towards the opposite side is restricted by an armature seat 81 configured as a stepped portion of a longitudinal bore 83 in the valve housing 38 when merely the spring force displaces the armature 22 towards the valve device 12.

Figure 1:
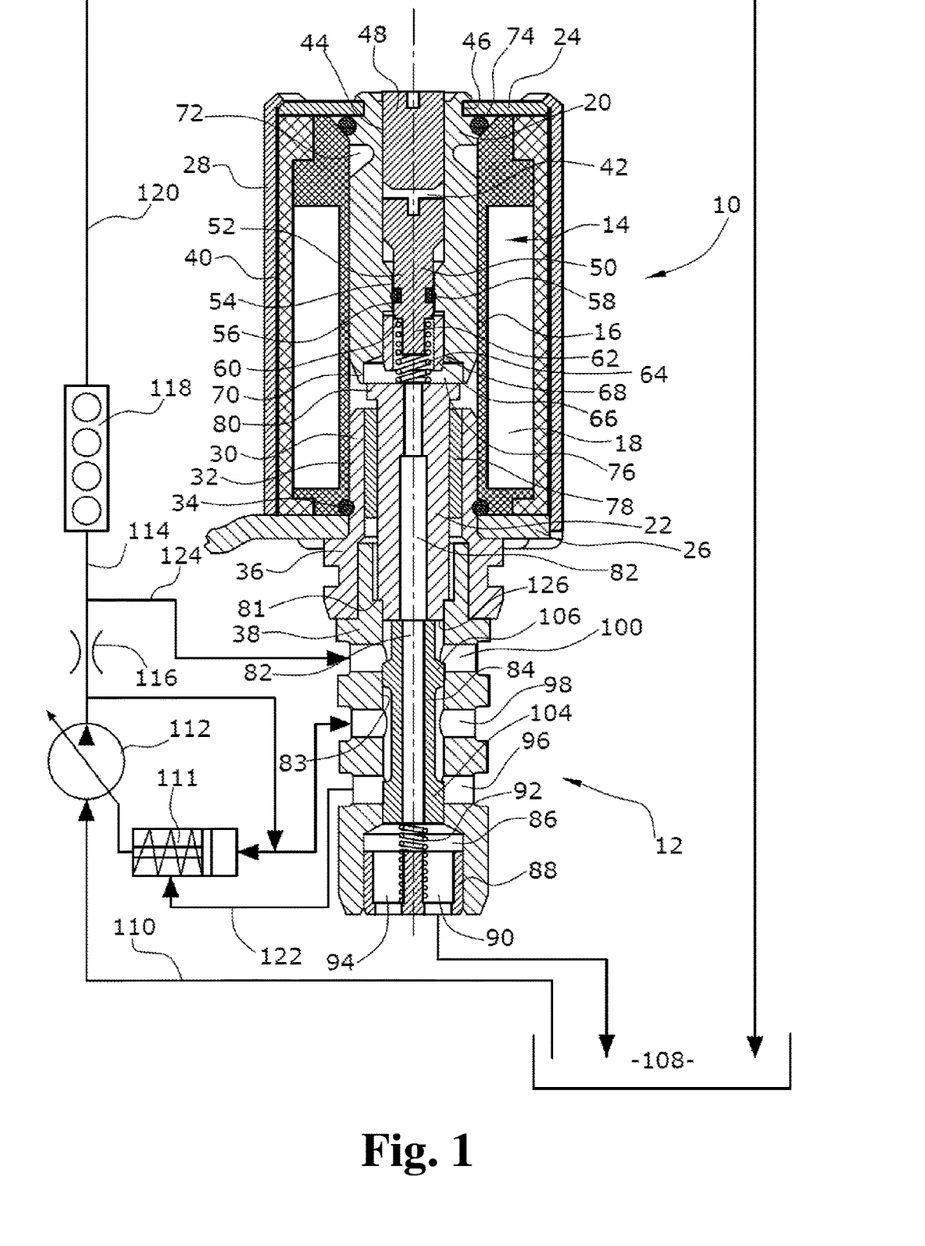
FIG. 1 shows an elevational view of a first embodiment of a valve device according to the present invention schematically illustrating attachment to an oil circuit of an internal combustion engine.

According to the embodiment shown in FIG. 1, the armature 22 comprises a longitudinal through-going bore 82 which also extends through a regulating slide 84 of the valve device 12 into a valve room 86 so that, in the valve room 86 and in the actuator room 76, atmospheric pressure always prevails. The valve room 86, which is configured at the axial end of the valve housing 38 opposite to the flux return bush 30, is delimited by a clamping bush 88 force-fitted into the valve housing 38, in which clamping bush 88 axial bores 90 are defined. The clamping bush 88 comprises a centrally arranged and axially extending projection which is radially surrounded by a readjusting spring 92 and serves as a guide of this readjusting spring 92 which loads the regulating slide 84 towards the armature 22 so that the former is permanently pressed against the armature 22. It should be noted that the readjusting spring 92 has a lower spring force than the spring element 64.

The valve housing 38 comprises three transverse bores in addition to the axially extending opening at the axial end of the valve housing 38. The axially extending opening serves as an outlet port 94 of the valve device 12. The first transverse bore defines a control chamber pressure port 96 and is configured in the area of the valve housing 38 remote from the actuator unit 10. The second transverse bore serves as an input port 98 and is arranged between the control chamber pressure port 96 and a control chamber pressure port 100 located closest to the actuator unit 10 and defined by a third transverse bore.

The regulating slide 84 which is mounted in the longitudinal bore 83 of the valve housing 38 comprises a first control surface 104 at the end remote from the actuator unit 10. Like a second control surface 106 of the regulating slide 84, this control surface 104 is defined by cylindrical enlarged portions at the regulating slide 84 whose outer diameter corresponds to the inner diameter of the valve housing 38. The distance between the two control surfaces 104, 106 is slightly larger than the distance between the inlet port 98 and the control chamber pressure port 96. The first control surface 104 has a height which is larger than the cross-section of the control chamber pressure port 96 so that the control chamber pressure port 96 is adapted to be completely closed by the first control surface 104. The second control surface 106 only serves for permanent separation of the control chamber pressure port 100 from the inlet port 98 so that its height is merely to be determined so that a flow is reliably prevented in any position of the regulating slide 84.

The function of this valve device as an oil pump regulation means is explained in the following on the basis of the oil circuit of an internal combustion engine.

The oil circuit is composed of an oil sump 108 from which oil is drawn by a variable oil pump 112 via a suction line 110. This oil flows for lubrication purposes through a discharge line 114 via various units 116 to be lubricated, which produce a pressure loss and are thus illustrated as a nozzle, to an internal combustion engine 118 and from there back to the oil sump 108 via a return line 120.

As mentioned before, the pump involved is a variable oil pump 112 where by adjustment of an eccentric ring, in which a pump rotor is rotated for discharge purposes, the volume flow and thus the discharge pressure $p_1$ are adjusted.

The eccentric ring is adjusted in a known manner by regulating the control pressure in a control chamber 111 of the variable oil pump 112. The control pressure acting in the control chamber 111 is regulated by means of the valve device according to the present invention by connecting the control chamber pressure port 96 of the valve device 12 with the control chamber 111 via a control line 122 so that the same control pressure always prevails at the control chamber pressure port 96 and in the control chamber 111. The discharge pressure of the variable oil pump 112 acts at the opposite side of the eccentric ring. The outlet port 94 of the valve device 12 serves as an outlet to the oil sump 108. The inlet port 98 is connected with the discharge line 114 of the variable oil pump 112 in the area of the outlet of the variable oil pump 112 so that the same pressure is adapted to be applied to both control chambers 111 of the variable oil pump 112. According to the present invention, the control chamber pressure port 100 is additionally connected with an oil line 124 which branches off the discharge line 114 immediately before reaching the internal combustion engine 118 and thus behind the units 116.

In the non-energized state of the valve device illustrated in FIG. 1, the armature 22 and thus the regulating slide 84 are pressed to the armature seat 81 by the compressive force of the spring element 64. In this state, the fluid connection between the outlet port 94 and the control chamber pressure port 96 is blocked by the first control surface 104, while a fluid connection between the inlet port 98 and the control chamber pressure port 96 is at least partly unblocked by the first control surface 104 so that oil having a discharge pressure $p_1$ reaches the control chamber pressure port 96. This results in an increase of the pressure in the control chamber 111 and thus an increased discharge pressure of the variable oil pump 112 since the eccentric ring is more and more moved towards the maximum discharge pressure.

Besides the force of the spring element 64, a hydraulic force acts via the pressure applied to the control chamber pressure port 100 upon an application surface 126 which is defined at the axial end of the armature 22 by configuring the cross-sectional area of the armature 22 with a larger diameter than the cross-sectional area of the regulating slide 84, whereby this application surface 126 radially projects beyond the regulating slide 84. This regulating pressure acting at the control chamber pressure port 100, which corresponds to the pressure at the inlet of the internal combustion engine 118, normally increases with an increasing discharge pressure of the variable oil pump 112.

When the regulating pressure reaches a certain limit value, this counterforce produced by the regulating pressure, along with the spring force of the readjusting spring 92, exceeds the spring force of the spring element 64, whereby the regulating slide 84 is displaced towards the actuator unit 10 until the first control surface 104 closes the control chamber pressure port 96, whereby the pressure buildup in the control chamber 111 is stopped. This closing is accordingly not effected depending on the discharge pressure of the variable oil pump 112, but depending on the pressure actually applied to the internal combustion engine 118.

In this state, all connections to the control chamber pressure port 96 are thus closed and there is an equilibrium of forces between the resultant oil pressure forces and the spring forces at the armature 22 and/or at the regulating slide 84. As a consequence, no oil discharge loss occurs since no changeover between outflow and inflow of oil from/to the control chamber 111 occurs.

At a pressure at the inlet to the internal combustion engine 118 further increasing either due to an increasing pressure of the variable oil pump 112 owing to increasing rotational speeds of the internal combustion engine 118 or due to a changing pressure loss of the units 116, the oil limiting function comes into effect. The regulating pressure applied to the application surface 126 of the armature 22 displaces the armature 22 and thus the regulating slide 84 via the readjusting spring 92 further towards the actuator unit 10, whereby a fluid connection between the control chamber pressure port 96 and the outlet port 94 is established. Oil thus flows from the control chamber 111 of the variable oil pump 112 into the oil sump 108, so that the pressure in the control chamber 111 decreases and the volumetric capacity of the variable oil pump 112 is thus reduced. The regulating pressure at the application surface 126 of the armature 22 thus again also decreases until the armature 22 is lowered again onto the armature seat 81, and the fluid connection between the control chamber pressure port 96 and the inlet port 98 is established until the regulating pressure is again sufficiently high so that an equilibrium of forces between the hydraulic forces and the spring forces is attained, whereby the control chamber pressure port 96 is again closed. It should be noted that the force which is required to displace the regulating slide 84 into its closing position depends on the spring force which can be adjusted via the adjusting screw 50.

For adjusting a desired regulating pressure, the electromagnetic circuit 14 can be activated by energizing the coil 18. The electromagnetic force produced acts towards the actuator unit 10 upon the armature 22, so that an equilibrium of forces must prevail between the hydraulic forces, the spring forces, and the electromagnetic force at the armature 22 for the position in which the control chamber pressure port 96 is closed to be reached. If a higher pressure is required by the engine control system, the current in the coil 18 is reduced so that the magnetic force decreases and the spring force exceeds the hydraulic force and the magnetic force. The regulating slide 84 is displaced into the position in which it unblocks the fluid connection between the inlet port 98 and the control chamber pressure port 96, whereby, in turn, the discharge pressure, and thus the regulating pressure, increase until the hydraulic force at the application surface 126 of the armature 22 is again sufficiently high so that the control chamber pressure port 96 is again closed.

At lower rotational speeds of the internal combustion engine 118, and thus a lower required regulating pressure, the current supply to the coil 18 is increased and the connection of the control chamber pressure port 96 to the outlet port 94 is opened until the hydraulic pressure at the application surface 126 of the armature 22 becomes small enough so that the regulating slide 84 is moved back into the position in which it closes the control chamber pressure port 96.

It follows therefrom that the current supply must be effected essentially inversely proportionally to the required oil pressure. Owing to the longitudinal through-going bore 82 and the resultant pressure balance in the valve room 86 and in the actuator room 76, no changing additional forces act upon the regulating slide 84 since atmospheric pressure always acts upon both sides of the unit made up of the armature 22 and the regulating slide 84.

It can also be seen that the additional control chamber pressure port 100 causes the discharge pressure of the variable oil pump 112 to always depend on the fed back regulating pressure at the inlet of the internal combustion engine 118 and thus to merely indirectly depend on the discharge pressure of the pump. The highest possible pump outlet pressure is always provided to the pump for adjusting purposes so that a reliable adjustment of the discharge pressure is provided which is independent of the pressure loss at the units 116. An optimized oil supply of the internal combustion engine is thus provided.

Figure 2:
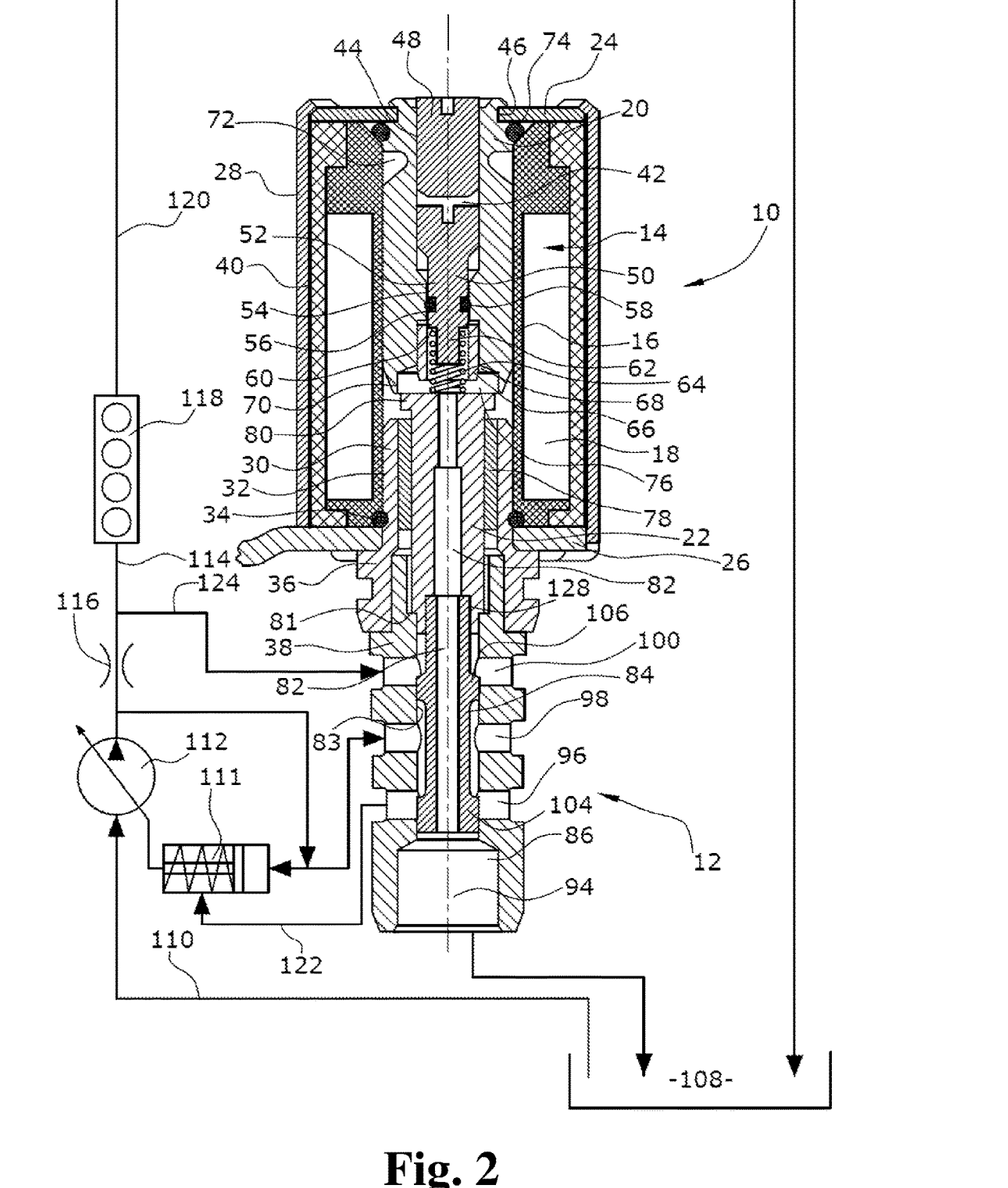
FIG. 2 shows an elevational view of a second embodiment of a valve device according to the present invention schematically illustrating attachment to an oil circuit of an internal combustion engine.

The same advantages are attained with the embodiment according to FIG. 2 which differs from the embodiment according to FIG. 1 in that the readjusting spring 92 and the clamping bush 88 at the outlet port 94 are omitted due to the fact that the regulating slide 84 is force-fitted into a corresponding opening 128 of the armature 22. The function of this valve device is identical with that described above, wherein the spring fore of the spring element 64 can be reduced since no further oppositely acting spring force is present. This embodiment prevents unintentional detaching of the regulating slide 84 from the armature 22 which might lead to an abrupt increase in the application surface 126 of the armature 22 and thus to unintentional opening.

Figure 3:
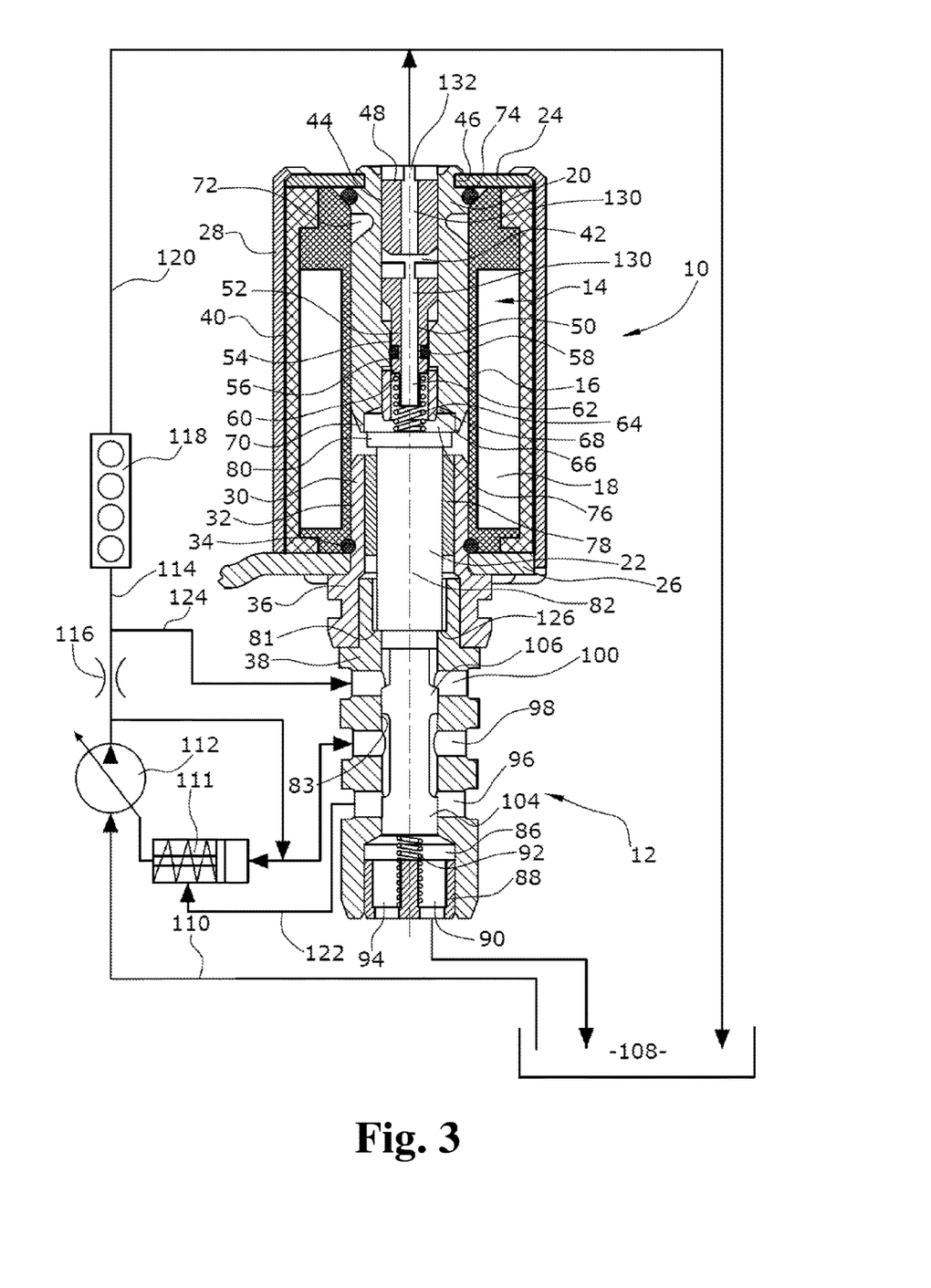
FIG. 3 shows an elevational view of a third embodiment of a valve device according to the present invention schematically illustrating attachment to an oil circuit of an internal combustion engine.

The valve device according to FIG. 3 differs from the other two exemplary embodiments in that the longitudinal through-going bore 82 in the armature 22 and in the regulating slide 84 is omitted and a longitudinal bore 130 is instead defined in the adjusting screw 50 and the core screw 48. At the end of the valve device 12 opposite to the outlet port 94, a second outlet port 132 is defined so that a connection to the actuator room 76 is established via the longitudinal bore 130. The second outlet port 132 is adapted to be connected with the oil sump 108, whereby to both sides of the armature 22 and/or the regulating slide 84, an identical pressure is again applied. This embodiment is particularly suitable when the valve device is directly arranged in the oil sump 108 since in this case connecting lines to the two outlet ports 94, 132 can be omitted.

It should be appreciated that these valve devices are also suitable for other hydraulic circuits. Design changes to the valve device as compared with the illustrated exemplary embodiment, such as armature and regulating slide being integrally formed or the housings being laid out in a different manner and the like, are also conceivable without departing from the scope of the main claim. Reference should be had to the appended claims.

What is claimed is:

1. A valve device for a hydraulic circuit, the valve device comprising:
 an actuator unit comprising,
  an electromagnetic circuit comprising an armature configured to move in a translational manner,
  a core,
  a coil carrier,
  a coil configured to be energized, the coil being arranged on the coil carrier, and
  a flux guiding device; and
 a valve unit comprising,
  a valve housing comprising a transverse bore configured to serve as a regulating pressure port,
  a regulating slide mounted in the valve housing, the regulating slide being configured to move axially,
  a first outlet port,
  an inlet port, and
  a control pressure port arranged between the inlet port and the first outlet port,
 wherein,
  the first outlet port is arranged at an end of the valve unit opposite to the actuator unit,
  the regulating pressure port is arranged between the actuator unit and the inlet port,
  a pressure applied to the regulating pressure port acts on the armature in a direction of the actuator unit, and
  the pressure applied to the regulating port acts on an application surface, the application surface being defined at an axial end of the armature comprising a cross-sectional area which projects radially beyond a cross-sectional area of the regulating slide.

2. The valve device as recited in claim 1, wherein the regulating slide comprises a first control surface which is configured,
 to close a first free flow cross-section between the inlet port and the control pressure port, or
 to regulate a second free flow cross-section between the control pressure port and the first outlet port, or
 to close the control pressure port.

3. The valve device as recited in claim 2, wherein the regulating slide further comprises a second control surface which separates the inlet port from the regulating pressure port.

4. The valve device as recited in claim 1, further comprising:
a threaded bore arranged in the core (20); and
an adjustment screw comprising a shoulder, the adjustment screw being configured to be fastened in the threaded bore,
wherein,
the spring element is configured to rest at an end opposite to the armature against the shoulder of the adjustment screw.

5. The valve device as recited in claim 4, wherein the shoulder comprises a projection extending therefrom towards the armature, the projection being surrounded by the spring element.

6. The valve device as recited in claim 4, further comprising:
a core screw arranged in the core, the core screw comprising a core screw longitudinal bore;
an actuator room arranged between the armature and the core; and
a second outlet port arranged at an end of the valve device opposite to the first outlet port,
wherein,
the adjustment screw comprises an adjustment screw longitudinal bore, and
the core screw longitudinal bore and the adjustment screw longitudinal bore together define a longitudinal bore via which the actuator room is connected with the second outlet port.

7. The valve device as recited in claim 1, further comprising:
a non-magnetizable stop sleeve,
wherein,
the core comprises a through-going bore,
the non-magnetizable stop sleeve is fastened in the through-going bore, and
the armature rests against the non-magnetizable stop sleeve when the armature is in an attracted position.

8. The valve device as recited in claim 1, further comprising:
a clamping bush comprising axial bores fastened in the first outlet port; and
a readjusting spring supported on the clamping bush, the readjusting spring being configured to load the regulating slide towards the armature.

9. The valve device as recited in claim 1, wherein
the armature comprises an armature opening, and
the regulating slide is force-fitted into the armature opening.

10. A valve device for a hydraulic circuit, the valve device comprising:
an actuator unit comprising,
an electromagnetic circuit comprising an armature configured to move in a translational manner,
a core,
a coil carrier,
a coil configured to be energized, the coil being arranged on the coil carrier, and
a flux guiding device; and
a valve unit comprising,
a valve housing comprising a transverse bore configured to serve as a regulating port,
a regulating slide mounted in the valve housing, the regulating slide being configured to move axially,
a first outlet port,
an inlet port,
a control pressure port arranged between the inlet port and the first outlet port,
an armature seat,
a spring element configured to load the armature in a direction out of the actuator unit whereby the inlet port is opened and the armature is moved towards the armature seat,
wherein,
the first outlet port is arranged at an end of the valve unit opposite to the actuator unit,
the regulating port is arranged between the actuator unit and the inlet port,
a pressure applied to the regulating port acts on the armature in a direction of the actuator unit, and,
the armature is configured be loadable by the actuator unit and by the pressure at the regulating pressure port via the regulating slide in an opening direction of the first outlet port and of the armature seat.

11. An oil pump regulating arrangement comprising:
a valve device comprising,
an actuator unit comprising,
an electromagnetic circuit comprising an armature configured to move in a translational manner,
a core,
a coil carrier,
a coil configured to be energized, the coil being arranged on the coil carrier, and
a flux guiding device, and
a valve unit comprising,
a valve housing comprising a transverse bore configured to serve as a regulating pressure port,
a regulating slide mounted in the valve housing, the regulating slide being configured to move axially,
an outlet port,
an inlet port, and
a control pressure port arranged between the inlet port and the outlet port;
a variable oil pump comprising,
a control chamber,
an oil sump,
wherein,
the control pressure port is in a fluid connection with the control chamber,
the outlet port is in a fluid connection with the oil sump, and
a discharge pressure of the oil pump is applied to the inlet port;
an internal combustion engine;
an oil line configured to branch off at the internal combustion engine; and
other units,
wherein, the regulating pressure port is connected with the oil line branching off at the internal combustion engine after an oil has flowed through the other units.

12. The oil pump regulating arrangement as recited in claim 11, wherein,
the regulating slide comprises a regulating slide through-going bore,
the armature comprises an armature through-going bore,
the regulating slide through-going bore and the armature through-going bore fluidly connect the actuator room between the armature and the core with the first outlet port, and
the valve device is arranged in the oil sump.

13. The oil pump regulating arrangement as recited in claim 11, wherein the valve device further comprises:
   a clamping bush comprising axial bores, the clamping bush being fastened in the first outlet port; and
   a readjusting spring supported on the clamping bush, the readjusting spring being configured to load the regulating slide towards the armature.

* * * * *